July 14, 1970    W. C. GORE ET AL    3,520,057
TUBE CUTTER TOOL WITH A CALIBRATED SCALE
Filed Nov. 24, 1967    2 Sheets-Sheet 1
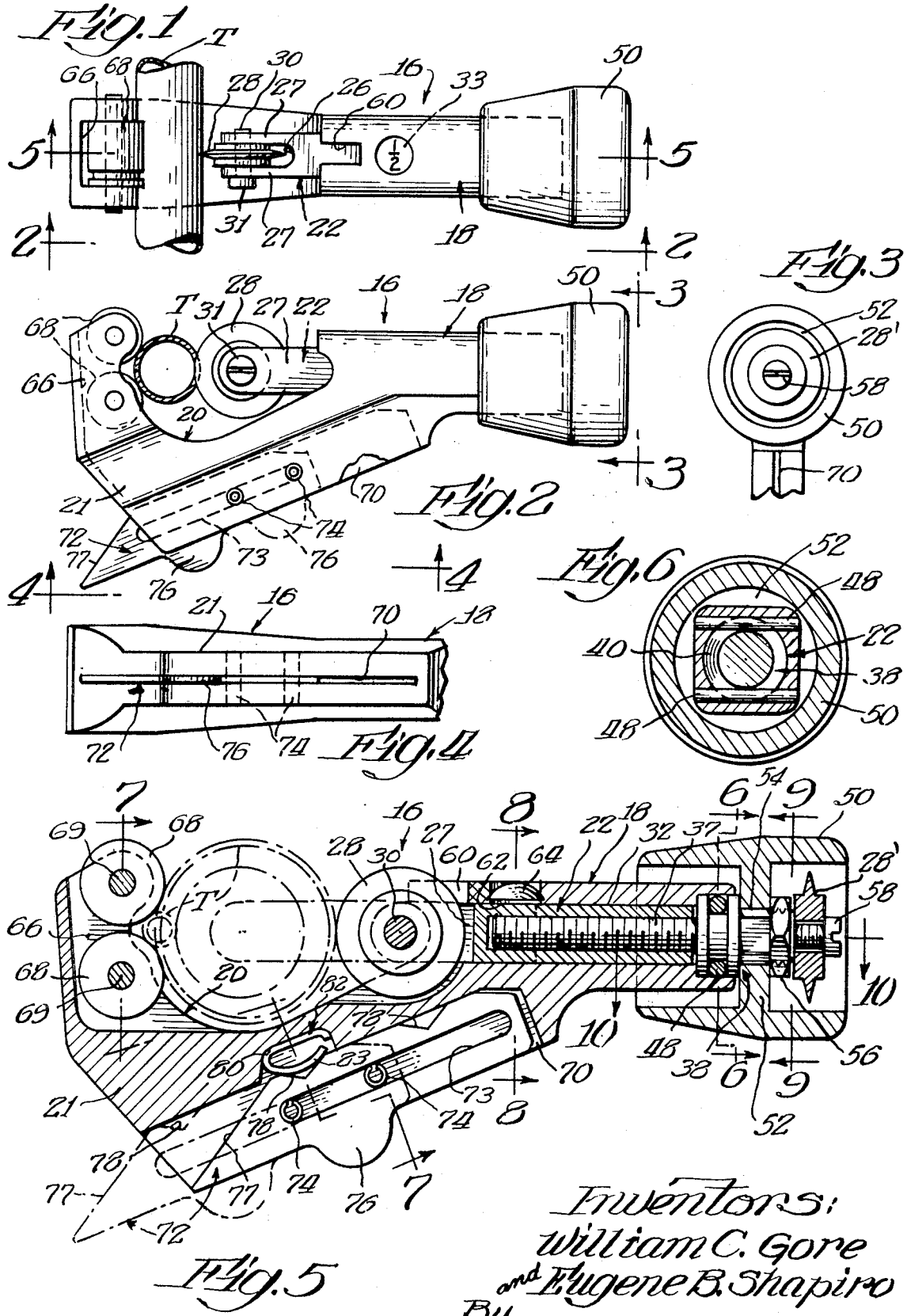
Inventors:
William C. Gore
and Eugene B. Shapiro
By Max R. Kraus Atty.

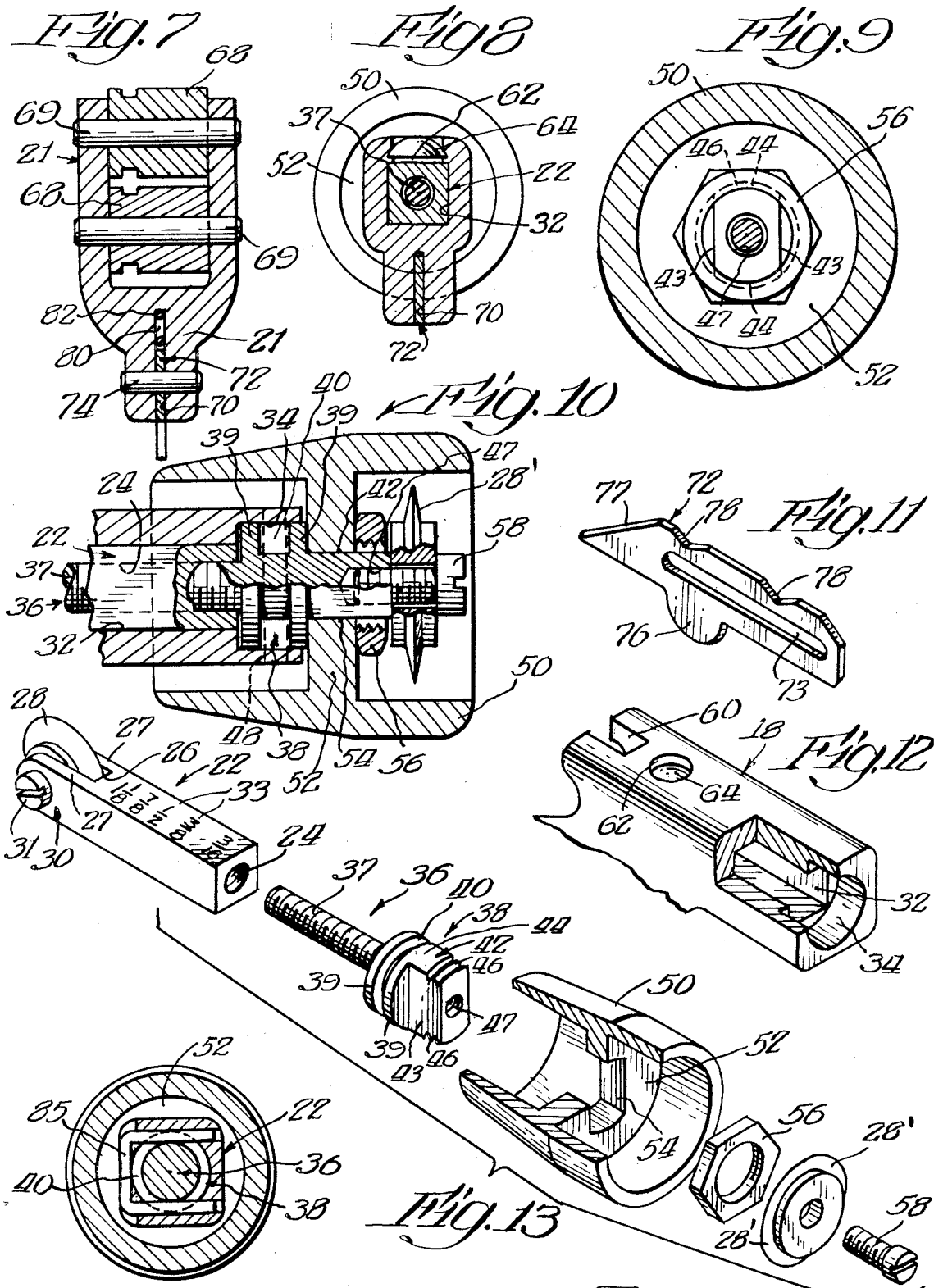

United States Patent Office 3,520,057
Patented July 14, 1970

3,520,057
TUBE CUTTER TOOL WITH A CALIBRATED SCALE
William C. Gore, Streamwood, and Eugene B. Shapiro, Highland Park, Ill., assignors to Chicago Specialty Manufacturing Co., Skokie, Ill., a corporation of Illinois
Filed Nov. 24, 1967, Ser. No. 685,684
Int. Cl. B23d *21/08*
U.S. Cl. 30—102                                    2 Claims

ABSTRACT OF THE DISCLOSURE

A tube cutter and reamer in which the tube cutter has means for indicating the diameter of the tube to be cut and in which the reaming device is movable into reaming and non-reaming positions.

---

One of the objects of this invention is to provide a tube cutter having a calibrated scale for indicating the diameter of the tube to be cut.

Another object of this invention is to provide a tube cutter having means for indicating the dimensions of the tube to be cut and wherein the scale is magnified to be readily visible.

Another object of this invention is to provide a combined tube cutter and reamer in which the tube cutter has the aforesaid features and in which the reamer is positioned on the side opposite that of the cutting wheel, and in which the reamer is movable to a reaming and non-reaming position.

Other objects will become apparent as this description progresses.

BRIEF DESCRIPTION OF THE DRAWINGS

In the drawings:
FIG. 1 is a top plan view of the tool showing a tube between the roller and the cutter wheel;
FIG. 2 is a side view taken on line 2—2 of FIG. 1;
FIG. 3 is an end view taken on line 3—3 of FIG. 2;
FIG. 4 is a plan view taken on line 4—4 of FIG. 2;
FIG. 5 is an enlarged sectional view taken on line 5—5 of FIG. 1;
FIG. 6 is a sectional view taken on line 6—6 of FIG. 5;
FIG. 7 is an enlarged sectional view taken on line 7—7 of FIG. 5;
FIG. 8 is a sectional view taken on line 8—8 of FIG. 5;
FIG. 9 is a sectional view taken on line 9—9 of FIG. 5;
FIG. 10 is a sectional view taken on line 10—10 of FIG. 5;
FIG. 11 is a perspective view of the blade member forming the reamer;
FIG. 12 is a perspective view taken away showing a portion of the body or frame member;
FIG. 13 is a perspective exploded view of certain of the operating parts, and
FIG. 14 is a cross-sectional view of a modification.

DESCRIPTION OF THE PREFERRED EMBODIMENT

Referring to the construction shown in FIGS. 1 to 13 inclusive, the tool has a body or frame member, generally designated by the numeral 16, integrally formed of a casting or forging or the like. The said body or frame comprises a longitudinally extending rear section 18 which merges into and is formed integrally with a generally C-shaped forward section 20. The rear section 18 of the frame slidably supports the cutter wheel carrying member generally designated by the numeral 22, best shown in perspective in FIG. 13.

The cutter wheel carrying member 22 is generally of rectangular shape and is preferably square-shaped in transverse cross-section and same is provided with an internally threaded bore 24. The forward end of the cutter wheel carrying member 22 is slotted or recessed as at 26 to provide spaced forward ends 27. The cutting wheel 28 is rotatably supported on a transverse shaft or pin 30 extending through alined openings in the spaced forward ends 27 of the carrying member 22. The pin 30 has a head 31 at one end having a groove to accommodate a screwdriver or the like. The pin 30 may be detachably secured to the carrying member 22 by a threaded nut or other fastening means or one of the forward ends 27 may be internally threaded to engage a threaded portion on the pin 30. This permits the pin 30 to be removed from the carrying member 22 and permits the cutter wheel 28 to be removed and replaced when desired. The top side of the carrying member 22 has engraved or otherwise impressed thereon a calibrated scale 33 which, as will be subsequently described, is calibrated to indicate the diameter of the tube or pipe to be cut.

As best seen in FIG. 5, the rear section 18 of the frame has a bore 32 extending therethrough which is of square shape in transverse cross-section to slidingly accommodate the square-shaped cutter wheel carrying member 22. The carrying member 22 is thus capable of movement forwardly and rearwardly in the bore 32. The rear section 18 of the frame has an enlarged annular recessed portion 34 at the rear end thereof adjacent the bore 32 for the purpose of accommodating the head of the screw threaded member, to be described.

A screw threaded member, generally indicated at 36, has an externally threaded shank 37 and an enlarged head portion generally designated by the numeral 38. The threaded shank 37 has a left-hand screw. The head includes a pair of spaced but connected annular members 39 providing an annular groove or channel 40 therebetween. Extending outwardly of the outermost annular member 39 is an extension 42 having opposite flat sides 43 and opposite arcuate-shaped ends 44. The flat sides 43 extend inwardly of the diameter of the annular member 39 but the arcuate ends 44 are of the same diameter as member 39. The outer ends of the arcuate ends 44 are threaded as at 46 to be engaged by a nut. The extension 42 has an internally threaded bore 47.

The threaded shank 37 of screw threaded member 36 is in engagement with the internally threaded bore 24 of the cutter wheel carrying member 22 and the enlarged head 38 fits within the enlarged recessed portion 34 of the rear section 18 of the frame, as best seen in FIG. 5. To permit rotation of the screw threaded member 36 but to prevent axial movement thereof, a pair of spaced pins 48 are positioned in the annular groove 40 of the head and said pins are suitably secured or anchored in the rear section 18 of the frame member. Thus, the threaded member 36 may be rotated, as will be presently described, but same does not move axially by virtue of the two pins 48.

A manually engageable knob, generally designated by the numeral 50 and shown in detail in FIGS. 5 and 13, is adapted to be secured to the head 38 of the screw member 36. The knob is of generally cylindrical shape and is hollow except for an intermediate transversely extending wall 52 which has a cutout or recess 54 conforming to the configuration of the extension 42 of threaded member 36. The recess 54 of the knob 50 engages the extension 42 so that rotation of the knob simultaneously rotates therewith the threaded member 36. As best seen in FIG. 5, the threaded end 46 of the extension 42 extends rearwardly of the intermediate wall 52. A nut 56 engages the threaded end 46. To lock the knob 50 to the member 36, the nut 56 is secured in engagement with the threaded end 46 of screw threaded member 36, as best seen in FIGS. 5 and 10.

An extra cutter wheel 28' is secured to the head 38 of threaded member 36 by means of a threaded bolt 58 passing through the central opening of the cutter wheel and being secured to the internally threaded bore 47 of the head 38. The extra cutter wheel 28' is secured so as to be readily removed for replacing the cutter wheel on the carrying member 22. Thus, there is at all times available an extra cutter wheel which is contained within the body of the knob. The front of the knob extends over a portion of the rear section 18 of the frame.

The front end of the rear section 18 of the frame has a recessed portion or slot 60 to accommodate the cutter 28 when the cutter carrier 22 is retracted to its innermost or rearward position. It will be seen that the movable cutter carrier 22 and the cutter wheel 28 is either advanced forwardly or retracted rearwardly by rotating the handle 50. Rotation of the handle 50 clockwise will through its engagement with the head 38 of the screw member 36 cause the screw member to be rotated to advance the cutter carrier 22 and the cutter wheel 28 carried thereby. Rotation of the handle or knob 50 counterclockwise will retract the cutter carrier 22 and the cutter wheel 28. The screw member 36, however, will not move axially.

As can best be seen in FIGS. 5 and 8, the top of the rear section 18 is provided with a circular cutout 62 and same is closed and covered by a magnifying lens 64 which is permanently secured to the rear section 18 within the cutout 62. Through this magnifying lens 64 and the opening 62 the calibrated scale 33 on the top of the cutter carrying member 22 is visible and magnified. By adjusting the position of the cutter wheel 28 so that it engages the tube or pipe T, as shown in FIGS. 1 and 2, the O.D. of the tube can be readily determined through the calibrated scale or indicator 33.

The front end of the forward section 20 of the tool is channel-shaped as at 66 and supports a pair of spaced grooved rollers 68 which are held in position by transverse pins 69, as is well understood. The tube T to be cut is positioned to rest between the rollers 68 and within the C-shaped forward section 20 and to be engaged by the cutter wheel 28. By rotating the tool around the tube T the cutting of the tube is performed. The cutting wheel is advanced by rotating the knob 50. The calibrated position of the cutter wheel is visible as cutting begins through the lens 64.

The tool has a reaming device, best shown in FIGS. 2, 5, 7 and 11, the purpose of which is to ream or remove any inside burr on the inside of a tube. The bottom 21 of the forward section 20 of the tool has a reduced width (FIG. 7) and is provided with a rectangular-shaped recess or slot 70 of a dimension to slidingly accommodate the reaming blade generally indicated at 72. The reaming blade (FIG. 11) is provided with a centrally positioned longitudinal slot 73. The blade is supported in the slot 70 and held therein for slidable movement by means of a pair of spaced pins 74 passing through the slot 73 and secured to the bottom 21 of the frame. The front pin 74 will engage the front end of the slot 73 and limit the rearward movement of the blade 72, while the rear pin 74 will engage the rear edge of the slot 73 and limit the forward movement of the blade. The blade has a bottom hump or extension 76 which extends outwardly of the bottom 21 of the frame 16 and said hump is adapted to be manually engaged for the purpose of sliding the blade 72 back and forth. The front edge of the blade is inclined as at 77 and said front edge serves as the reaming edge. The longitudinal top side of the blade is provided with a pair of generally V-shaped spaced recesses 78. The bottom section 21 has a recess 80 which is above and communicates with the longitudinal recess or slot 70. Fitting within the recess 80 and retained therein is a spring detent 82 (FIG. 5) which has a lower arcuate-shaped portion 83. This portion is adapted to engage with the V-shaped cutouts 78 of the reaming blade when same is in alinement therewith and the engagement of the spring therewith will cause the blade to be held in its moved position. However, while held by the spring detent 82, the reaming blade can be slid by manual pressure exerted against the blade by engagement with the hump 76. With the blade moved forwardly to its reaming position, as shown in FIG. 2, the spring detent 82 will be in engagement with the rear recess 78 of the blade. The spring pressure is sufficient to maintain the blade in reaming position during the reaming operation and the blade will not be accidentally displaced or slid. It will also be held in its retracted position, as shown in full lines in FIG. 5, when the spring engages the front recess 78 of the blade.

This device performs a twofold function, namely, that of serving as a tube cutter through the operation of the cutter wheel 28, and as a reamer for removing burrs through the operation of the reaming blade 72.

Referring to the modification shown in FIG. 14, the modification is only with respect to the means for permitting the rotation of the screw member 36 and preventing axial movement thereof. In place of the two transverse pins 48 shown in FIG. 5, a U-shaped spring clip 85 may be substituted. The spring clip 85 is in engagement with the annular groove or channel 40 of the head 38 of the screw member.

The cutter wheels 28 and 28' are made of metal and are used on copper, aluminum or soft brass tubing. To cut a plastic tubing the cutter wheel is provided with a thinner cutting edge than that shown in the drawings.

It will be understood that various changes and modifications may be made from the foregoing without departing from the spirit and scope of the appended claims.

We claim:

1. A tool of the character described having a body member, said body member having a C-shaped forward section with an integrally formed rear section, said C-shaped forward section having roller means adjacent the front thereof against which a tube to be cut is positioned, said rear section having a bore of a generally square-shaped cross-section, a cutter wheel carrying member having a generally square-shaped cross-section and axially slidable in said bore, a cutter wheel mounted on the forward end of said carrying member, said carrying member having an internally threaded bore, externally threaded rotatable means cooperating with said carrying member to advance or retract the carrying member with the cutter wheel thereon with respect to a tube to be cut, said slidable carrying member having a calibrated scale on the top side thereof, said rear section of said body member having an opening at the top thereof through which said scale is visible.

2. A tool as set forth in claim 1 in which the opening in the rear section of the body member has a magnifying glass to magnify the readings on the calibrated scale.

References Cited

UNITED STATES PATENTS

| 667,143 | 1/1901 | Tryon | 30—102 X |
|---|---|---|---|
| 2,011,226 | 8/1935 | Lehman | 33—166 |
| 2,349,604 | 5/1944 | Barrows | 33—166 X |
| 2,629,926 | 3/1953 | Franck | 30—102 |
| 2,630,029 | 3/1953 | Franck | 30—102 X |
| 2,871,733 | 2/1959 | Lauck | 30—102 X |

FOREIGN PATENTS 1,507,273  11/1967  France.

ROBERT C. RIORDON, Primary Examiner

J. C. PETERS, Assistant Examiner

U.S. Cl. X.R.

33—185